(12) United States Patent
Bonneau et al.

(10) Patent No.: US 10,909,133 B1
(45) Date of Patent: *Feb. 2, 2021

(54) BROWSE HIERARCHIES CUSTOMIZED FOR RULES BASED CUSTOM CATALOGS

(71) Applicant: Versata Development Group, Inc., Austin, TX (US)

(72) Inventors: Scott Bonneau, Austin, TX (US); Michael Nonemacher, Austin, TX (US); Jeremy Weinrib, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/539,641

(22) Filed: Aug. 13, 2019

Related U.S. Application Data

(63) Continuation of application No. 13/678,348, filed on Nov. 15, 2012, now Pat. No. 10,417,246, which is a
(Continued)

(51) Int. Cl.
*G06Q 30/00* (2012.01)
*G06Q 30/02* (2012.01)
(Continued)

(52) U.S. Cl.
CPC ......... *G06F 16/248* (2019.01); *G06Q 30/02* (2013.01); *G06Q 40/06* (2013.01)

(58) Field of Classification Search
CPC ........ G06Q 30/20; G06Q 40/00; G06Q 99/00; G06Q 10/08; G06Q 30/02; G06Q 30/0641; G06F 8/20; G06F 17/30
(Continued)

(56) References Cited

U.S. PATENT DOCUMENTS 5,644,740 A * 7/1997 Kiuchi ............... G06F 16/3323
715/853
5,740,425 A * 4/1998 Povilus ............... G06Q 10/087
(Continued)

FOREIGN PATENT DOCUMENTS

EP 0206504 A2 * 5/1986 ............. G06F 15/44

OTHER PUBLICATIONS

Dagan et al. "Keyword-Based Browsing and Analysis of Large Document Sets" 1996, In Proceedings Fo the International Symposium on Document Analysis and Information Retrieval.*
(Continued)

*Primary Examiner* — Kelly S. Campen

(57) ABSTRACT

An arbitrary number of custom catalogs for an arbitrary number of customers can be published from a single database of seller catalog data. Custom browse hierarchies can be generated for each of the custom catalogs. The custom catalogs are subsets of the catalog database, and are generated in accordance with a set of rules that defines the scope of the content of the custom catalog. The rule sets define a series of sequential searches by which a subset of the product SKUs contained in the database are returned. A primary hierarchy is maintained that can have a scope coextensive with the primary database. Custom browse hierarchies can be pruned to render their scope approximately coextensive with each subset. The custom catalog subsets and the custom browse hierarchies are generated periodically through a virtual publication process.

20 Claims, 12 Drawing Sheets

Related U.S. Application Data continuation of application No. 12/880,724, filed on Sep. 13, 2010, now Pat. No. 8,332,428, which is a continuation of application No. 09/884,375, filed on Jun. 18, 2001, now Pat. No. 7,797,271.

(51) Int. Cl.
*G06Q 40/06* (2012.01)
*G06F 16/248* (2019.01)

(58) Field of Classification Search
USPC ........ 707/722, 999.1, 3, 999.003; 705/26.81, 705/7.11, 35, 27.1; 714/43; 395/704; 1/1
See application file for complete search history.

(56) References Cited

U.S. PATENT DOCUMENTS

| | | | | | |
|---|---|---|---|---|---|
| 5,749,081 | A | * | 5/1998 | Whiteis | G06Q 30/02 |
| 5,878,400 | A | * | 3/1999 | Carter, III | G06Q 20/201 |
| | | | | | 235/378 |
| 5,918,053 | A | * | 6/1999 | Graham | G06F 8/20 |
| | | | | | 707/999.102 |
| 5,933,599 | A | * | 8/1999 | Nolan | G06F 9/45512 |
| | | | | | 715/733 |
| 6,067,552 | A | * | 5/2000 | Yu | G06F 16/9558 |
| | | | | | 715/234 |
| 6,360,216 | B1 | * | 3/2002 | Hennessey | G06F 16/2423 |
| 6,366,910 | B1 | * | 4/2002 | Rajaraman | G06F 16/285 |
| 6,460,025 | B1 | * | 10/2002 | Fohn | G06F 16/904 |
| | | | | | 706/45 |
| 6,466,918 | B1 | * | 10/2002 | Spiegel | G06Q 30/02 |
| | | | | | 705/7.29 |
| 6,480,857 | B1 | * | 11/2002 | Chandler | G06F 16/2246 |
| | | | | | 707/792 |
| 6,489,968 | B1 | * | 12/2002 | Ortega | G06F 3/0482 |
| | | | | | 715/713 |
| 6,523,021 | B1 | * | 2/2003 | Monberg | G06F 16/951 |
| 7,103,605 | B1 | * | 9/2006 | Hazi | G06Q 30/02 |
| 2002/0138481 | A1 | * | 9/2002 | Aggarwal | G06Q 30/02 |
| 2002/0147656 | A1 | * | 10/2002 | Tam | G06Q 30/02 |
| | | | | | 705/26.41 |
| 2004/0012631 | A1 | * | 1/2004 | Skorski | G06Q 30/02 |
| | | | | | 715/762 |

OTHER PUBLICATIONS

Feldman et al. "Mining Text Using Keyword Distributions" 1998 Journal of Intelligent Information Systems, 10, pp. 281-300.*
Michael Hitchens and Andrew Fimage; "The Design of a Flexible Class Library Management System"; 1998; IEEE; pp. 60-69.*
Katz, V and Li, W. S.; "Topic distillation on hierarchically categorized web documents"; 1999; pp. 1-8.*
Buyukkokten et al, "Power Browser: Efficient Web Browsing for PDAs" Apr. 1-6, 2000, CHI letter, vol. 2, issue 1, p. 430.*
Response to Non-Final Office Action dated Mar. 2, 2015, filed in U.S. Appl. No. 13/678,348, pp. 1-19.
Non-Final Rejection dated Oct. 1, 2014, filed in U.S. Appl. No. 13/678,348, pp. 1-14.
Notice of Allowance dated May 3, 2019, filed in U.S. Appl. No. 13/678,348, pp. 1-5.
Request for Continued Examination dated Feb. 18, 2019, filed in U.S. Appl. No. 13/678,348, pp. 1-24.
Advisory Action dated Jan. 30, 2019, filed in U.S. Appl. No. 13/678,348, pp. 1-3.
Response to Final Office Action dated Jan. 17, 2019, filed in U.S. Appl. No. 13/678,348, pp. 1-21.
Final Rejection dated Sep. 17, 2018, filed in U.S. Appl. No. 13/678,348, pp. 1-13.
Request for Continued Examination dated Aug. 9, 2018, filed in U.S. Appl. No. 13/678,348, pp. 1-3.
Pre-Brief Appeal Conference Decision dated Feb. 9, 2018, filed in U.S. Appl. No. 13/678,348, pp. 1-2.
Pre-Brief Conference Request dated Jan. 5, 2018, filed in U.S. Appl. No. 13/678,348, pp. 1-5.
Notice of Appeal dated Jan. 5, 2018, filed in U.S. Appl. No. 13/678,348, pp. 1-2.
Response to Final Office Action dated Dec. 12, 2017, filed in U.S. Appl. No. 13/678,348, p. 1.
Advisory Action dated Dec. 12, 2017, filed in U.S. Appl. No. 13/678,348, pp. 1-3.
Response to Final Office Action dated Dec. 5, 2017, filed in U.S. Appl. No. 13/678,348, pp. 1-17.
Final Rejection dated Jul. 5, 2017, filed in U.S. Appl. No. 13/678,348, pp. 1-19.
Request for Continued Examination dated Mar. 10, 2017, filed in U.S. Appl. No. 13/678,348, pp. 1-28.
Advisory Action dated Jan. 20, 2017, filed in U.S. Appl. No. 13/678,348, pp. 1-3.
Response to Final Office Action dated Jan. 10, 2017, filed in U.S. Appl. No. 13/678,348, pp. 1-21.
Final Rejection dated Nov. 10, 2016, filed in U.S. Appl. No. 13/678,348, pp. 1-13.
Response to Non-Final Office Action dated Oct. 17, 2016, filed in U.S. Appl. No. 13/678,348, pp. 1-20.
Non-Final Rejection dated May 16, 2016, filed in U.S. Appl. No. 13/678,348, pp. 1-10.
Terminal Disclaimer dated Nov. 20, 2015, filed in U.S. Appl. No. 13/678,348, pp. 1-3.
Request for Continued Examination dated Nov. 20, 2015, filed in U.S. Appl. No. 13/678,348, pp. 1-16.
Final Rejection dated May 20, 2015, filed in U.S. Appl. No. 13/678,348, pp. 1-12.
Examiner Initiated Interview Summary dated Oct. 1, 2014, filed in U.S. Appl. No. 13/678,348, p. 1-8.
Vliscellanneous Communication to Applicant dated Mar. 26, 2013, filed in U.S. Application No. 13/678,348, p. 1.
Applicant Arguments/Remarks Made in an Amendment dated Mar. 13, 2013, filed in U.S. Appl. No. 13/678,348, pp. 1-34.
Preliminary Amendment dated Nov. 15, 2012, filed in U.S. Appl. No. 13/678,348, pp. 1.

* cited by examiner

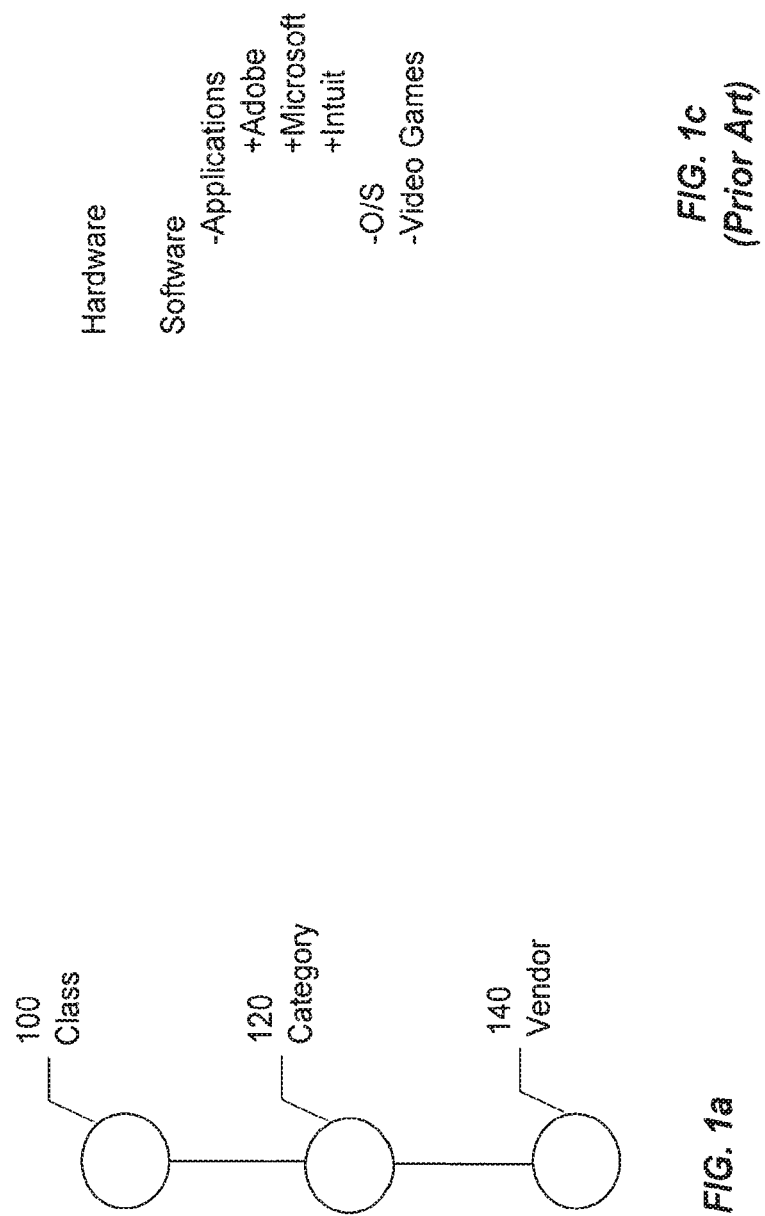

| SKU | ATT-D | VAL | PRODTYPE ID |
|---|---|---|---|
| 123 | 1 | COMPAQ | 1 |
| 123 | 2 | 500 MHZ | 1 |
| 123 | 3 | 512K | 1 |
| 123 | 4 | 56K | 1 |
| 321 | 5 | HP | 2 |
| 321 | 6 | COLOR | 2 |
| 321 | 7 | 10PG/MIN | 2 |
| 321 | 8 | 600 DPI | 2 |

*FIG. 5a*

| SKU | ATT#1 | ATT#2 | ATT#3 | ATT#4 |
|---|---|---|---|---|
| 123 | COMPAQ | 500 MHZ | 512 K | 56 K |
| 124 | COMPAQ | 750 MHZ | 1024 K | 56 K |
| 125 | Dell | 500 MHZ | 2048 K | 56 K |

PROD. TYPE = 1 = DESK-TOP COMPUTER

| | ATT#5 | ATT#6 | ATT#7 | ATT#8 |
|---|---|---|---|---|
| 321 | HP | COLOR | 10 PG/MIN | 600 DPI |
| 321 | HP | COLOR | 10 PG/MIN | 300 DPI |

PROD. TYPE = 2 = PRINTER

*FIG. 5b*

| SKU | SUBSET ID |
|-----|-----------|
| 123 | 001 |
| 124 | 001 |
| 123 | 002 |
| 124 | 002 |
| 125 | 002 |
| 123 | 003 |
| 124 | 003 |
| 125 | 003 |
| 321 | 003 |
| 322 | 003 |
| 321 | 004 |
| 322 | 004 |

*FIG. 6*

BROWSE HIERARCHIES CUSTOMIZED FOR RULES BASED CUSTOM CATALOGS

CROSS REFERENCE TO RELATED APPLICATIONS

This application relates to application Ser. No. 09/884,179, filed on Jun. 18, 2001, entitled "Rules Based Provision of Custom Pricing for Multiple Entities" and naming Scott Bonneau, Michael Nonemacher and Jeremy Weinrib as inventors, the application being incorporated herein by reference in its entirety.

This application relates to application Ser. No. 09/884,216, filed on Jun. 18, 2001, entitled "Rules Based Custom Catalogs Generated from a Central Catalog Database for Multiple Entities" and naming Scott Bonneau, Michael Nonemacher and Jeremy Weinrib as inventors, now U.S. Pat. No. 6,978,273, issued Dec. 20, 2005, the application being incorporated herein by reference in its entirety.

This application relates to application Ser. No. 09/884,180, filed on Jun. 18, 2001, entitled "Logical and Constraint Based Browse Hierarchy with Propagation Features" and naming Scott Bonneau, Michael Nonemacher and Jeremy Weinrib as inventors, now U.S. Pat. No. 6,834,282, issued Dec. 21, 2004, the application being incorporated herein by reference in its entirety.

This application relates to application Ser. No. 09/886,691 now abandoned, filed on Jun. 18, 2001, entitled "A Method For Building Digital Databases Optimized For Maintenance, Descriptiveness, And Fast Search" and naming Scott Bonneau and Michael Nonemacher as inventors, the application being incorporated herein by reference in its entirety.

This application is a continuation of co-pending U.S. application Ser. No. 12/880,724, filed Sep. 13, 2010, which is a continuation of co-pending application Ser. No. 09/884,375, filed Jun. 18, 2001, now U.S. Pat. No. 7,797,271. Both of these applications are incorporated herein by reference in their entireties.

BACKGROUND OF THE INVENTION

Field of the Invention

The present invention relates to the field of on-line catalogs, and more particularly to browse hierarchies that are customized in scope to be substantially coextensive with the scope of each of a number of customized versions of an on-line catalog, the customized browse hierarchies being pared down in scope from a primary hierarchy in accordance with rules-based searches of a central catalog database maintained by the seller.

Description of the Related Art

With the advent of Internet based commerce, organizations on both the buy and sell side of business-to-business (B2B) procurement relationships have sought to harness computer networks as a means for automating the procurement process between them. To facilitate e-commerce, and particularly e-procurement, suppliers of goods and services have developed electronic catalogs by which potential buyers can electronically receive and display information regarding the goods and services offered by the supplier, including descriptive information, pictures and prices.

For many reasons, a seller does not often find it desirable to supply the same catalog to all buyers. For instance, a catalog for businesses may be different than a catalog to personal consumers, and catalogs may be different from business to business. The types of computers and peripherals offered to businesses may provide higher performance and as a result are more costly than computer equipment targeted toward consumers. Further, the types of goods and services (i.e. items) marketed to one type of business may differ significantly from those targeted toward another type of business. Moreover, buyers that purchase high volumes of products or services will often negotiate unique pricing agreements with sellers that afford significant discounts compared to lower volume purchasers. Thus, it would be highly desirable from the seller's perspective for each buyer or group of buyers to have their own unique catalog, one that is customized to reflect the individual product/service interests of each customer or customer group, as well their unique business processes and relationships.

For a seller offering many different items (i.e. products or services), maintaining even one version of an e-catalog can be extremely difficult. To maintain several custom versions of an electronic catalog, a physical manifestation of each custom version is typically created and each version must be maintained and updated as the catalog data changes. Each time an item is added, or the attributes or attribute values associated with an item are changed, every physical manifestation of a version of the catalog must be individually updated to ensure that each version reflects the changes in the catalog data. Each version essentially becomes obsolete until updated.

Another issue confronted by sellers offering goods and services for sale over the Internet, whether through electronic catalogs or a web site, is how to present their product and service information in a manner that facilitates efficient browsing by a buyer. The most commonly used technique is to present the information hierarchically to guide the buyer quickly and efficiently to items of interest to the buyer. One hierarchy commonly used by sellers to organize the presentation of items is a "classification—category—vendor" hierarchy. A simple representation of this hierarchy is illustrated in FIG. 1a. Imposing this hierarchy requires that items are explicitly stored in the database along with values for each of these three attributes, or the attributes can be implicitly associated with each item based on the location of the item in the database.

At the classification level 100 of the hierarchy of FIG. 1, catalog items are split into some predetermined number of classes each represented by a unique class label. Each class node is then split at the category level 120 into some number of category nodes equal to the number of predetermined categories established under each class. The category nodes are then split at the vendor level 140 to create some number of vendor nodes under each category equal to the precise number of vendors supplying items in the category.

FIG. 1b is illustrates one possible example of a hierarchy created in accordance with the model of FIG. 1a. In the example, the items in the catalog database are divided into two very general classes: hardware and software. The hierarchy of FIG. 1b reflects these classes with two nodes at the class level 100, one labeled as "hardware" 180 and one labeled as "software" 160. The class nodes are then split at the category level 120 into categories represented by the nodes "DIS (operating systems)" 162, "applications" 164 and "video games" 166. Under the "hardware" node 180, the categories might be "PCs (personal computers)" 182, "peripherals" 186, and "storage" 184. Finally, the nodes at the category level 120 are split at the vendor level 40 according to the particular vendors supplying items from each category as illustrated.

FIG. 1c illustrates the manner in which a seller can then display this hierarchy in the form of hyperlinks on a web page that can be transmitted to a buyer for display on the buyer's computer terminal using web browser software. Typically, the top-level nodes of the hierarchy are displayed first. If a user-buyer selects one of the class nodes, the category nodes are then displayed as a class node in a manner that indicates they are children falling under the class (e.g. indented). Those of skill in the art recognize that there a number of ways in which a user can select hyperlinks, including the positioning of a cursor using a computer mouse and then activating the (i.e. selecting) the node by actuating a button on the mouse. Selection of a category node then causes the child vendor nodes to be displayed under the selected category node. In FIG. 1c, the class node "Software" was selected, which led to the display of category child nodes "Applications," "O/S" and "Video Games." The "Applications" node was then selected, leading to the display of child vendor nodes "Adobe," "Microsoft" and "Intuit" Selecting the "Adobe" node will typically cause the retrieval from the database and display of all Adobe software application items. This might include a list of part numbers or SKUs, attributes and any descriptive marketing text and images associated with those items.

Under circumstances where a seller is generating custom catalogs for a number of different buyers or buyer groups, it would be preferable to generate custom browse hierarchies for each of the custom versions of the catalog. Each custom browse hierarchy would preferably have a scope that is coextensive with (or at least does not exceed) the scope of items that are included in each custom version of the catalog. For example, if a custom version of a seller's catalog database does not include video game software items, the seller would preferably exclude the "video games" node (and any of its children) from the browse hierarchy of FIG. 1b. Otherwise, the buyer for whom the custom catalog is generated may be confused or annoyed by the existence of a link in the browse hierarchy for which there are no items in the buyer's customized version of the catalog. Thus, it would be preferable for a seller to provide a browse hierarchy for each custom version of the seller's catalog such that the browse hierarchy is itself customized in scope to be substantially coextensive with the subset of catalog items included in that version of the catalog.

Moreover, it would be highly desirable from the seller's perspective if the seller could maintain all catalog data in a central database and in one physical location, and generate customized versions of its catalogs for its various buyers and buyer groups based on the central database. Further, it would be desirable if a custom browse hierarchy could be generated for each custom version of the catalog from a centrally maintained primary browse hierarchy. The primary browse hierarchy would typically (but not necessarily) have a scope that is approximately coextensive with the catalog database. Each custom browse hierarchy would have a scope that is pared down from the primary hierarchy and typically (although not necessarily) coextensive with the scope of its associated custom version of the catalog. Finally, it would be preferable if buyers were coupled to the catalog database through a network, so that the seller could present the customized versions of its browse hierarchies and catalog data to its buyers on a virtual basis. This would eliminate the need to publish and deliver physical manifestations of the customized versions of the catalog and their associated browse hierarchies.

SUMMARY OF THE INVENTION

In one embodiment of the method of generating a plurality of custom browse hierarchies for each of a unique subset of items in a catalog database, a primary hierarchy is established that is representative of the items in the catalog database. Then, for each leaf node of the primary hierarchy, a search rule is derived that comprises an aggregation of constraints specified by the leaf node and its ancestors. In one embodiment, the rule is an "include" rule that defines all items in the database that meet the aggregation of constraints. The constraints are one or more attributes having predefined permissible values. The search rule is then used to identify, for each leaf node in the primary hierarchy, all of the unique subsets that contain at least one of the items meeting the aggregation of constraints.

In one embodiment, each of the unique subsets are identified by a different subset ID, and each of the items comprising each of the unique subsets is stored in an entry of a subset ID table. The entry further contains the subset ID that identifies the unique subset to which the item belongs. The rule for each leaf node is converted into a database query that performs two functions to accomplish the identifying process. First a search of the database is executed to identify each of the items in the database that meet the constraints for the rule derived for each leaf node. Second, for each of the items identified as meeting the constraints by the search, the method performs a table join between a table containing the identified item and a subset ID table. The table join then returns a list of all subset Ws that are stored in an entry of the subset ED table along with the identified item.

In one embodiment, a custom browse hierarchy is then created for each of the unique subsets based on the returned lists for each leaf node of the primary hierarchy. The custom browse hierarchy is created for each unique subset by retaining from the primary hierarchy only those leaf nodes, and their ancestors, for which the subset ID of the unique subset has been included in the returned list of subset ID for that leaf node.

Embodiments of an apparatus for generating custom browse hierarchies have been disclosed which perform the method. The apparatus includes a database storage device in which the catalog data is stored, and a database server by which the catalog data is searched and accessed in accordance with the invention. An applications server communicates with the database server to initiate the searches, maintain the browse hierarchies and to interact with users through the web server. The web server provides access to the database to users by means of a browser over the Internet, and the browse hierarchy customized for a particular user is provided to that user for purposes of browsing the unique subset of the database to which the user has been assigned as the user's custom catalog.

BRIEF DESCRIPTION OF THE DRAWINGS

The present invention may be better understood, and its numerous objectives, features and advantages made apparent to those skilled in the art by referencing the accompanying drawings. The use of the same reference number throughout the several figures designates a like or similar element.

FIG. 1a shows a prior-art catalog browsing hierarchy based on classification scheme.

FIG. 1b shows an example of hierarchy based on the classification scheme of FIG. 1a.

FIG. 1e shows an example of how the browsing hierarchy of FIG. 1b might be displayed to a user as the user browses a catalog database.

FIG. 5*a* shows an example of how one embodiment of the centralized catalog database is arranged for maintenance.

FIG. 5*b* shows an example of how a read-only version of the centralized catalog database of FIG. 5*a* is arranged during version publication to facilitate the searches used to generate the versions and the custom browse hierarchies.

FIG. 6 illustrates a subset table generated by the method and apparatus for generating custom browse hierarchies.

DETAILED DESCRIPTION

Overview

The method and apparatus for generating custom browse hierarchies generates a customized version of a browse hierarchy of suitable scope for each of an arbitrary number of customized versions of the seller's catalog. Each custom catalog is generated for an arbitrary number of buyers or buyer groups from a centrally maintained database of catalog items. Each custom browse hierarchy is generated using a primary browse hierarchy of a scope that is preferably (but not necessarily) coextensive with the seller's entire catalog database. Each custom catalog reflects a unique subset of the items in the catalog database; the scope of each subset is defined by a set of rules based constraints. Each browse hierarchy is generated for a given custom catalog by pruning the primary hierarchy to reflect a scope that is preferably (but not necessarily) substantially coextensive with the scope of the subset of items included in the given custom catalog.

The seller's catalog database is centrally managed and maintained, as is the primary browse hierarchy representing the items stored in the catalog database. The seller's catalog database consists of data representing items offered for sale by the seller. Each item is categorized as a product type having a set of attributes and a unique set of values for those attributes. Each item is identified with a unique SKU, and is represented in the database by its SKU and each of its attribute values. Also optionally associated with each item SKU is descriptive information (e.g. descriptive text, pictures, and the like) normally associated with the catalog display of products or services. Each SKU identifies exactly one item in the database consisting of a unique set of attribute values.

Figure 1B:
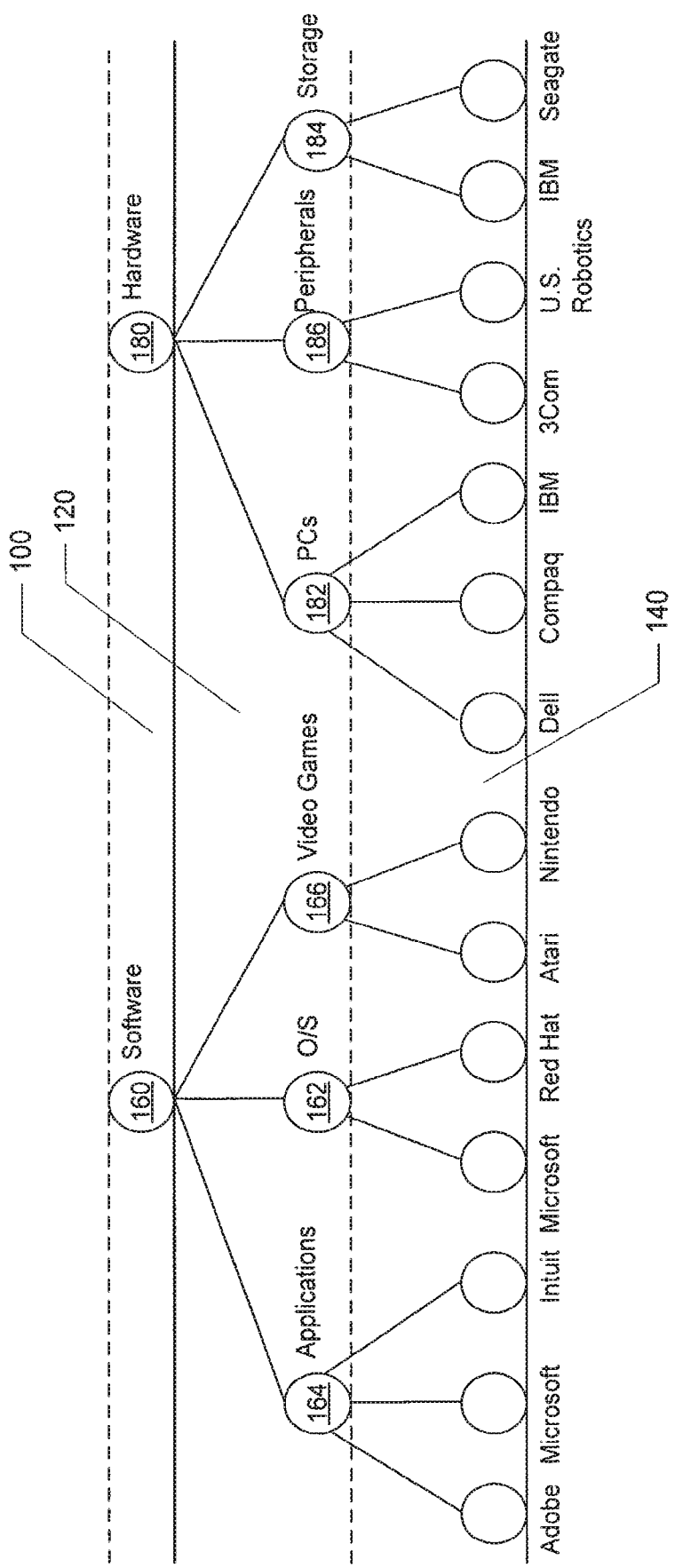

The primary hierarchy consists of nodes labeled to identify various classes and categories (including sub-classes and sub-categories) of catalog items in the database. Each node can define those catalog items falling under them in the hierarchy by constraining the scope of those items to have only specific values for those attributes. Item attributes can be for example, the Class-Category-Vendor attributes illustrated in FIG. 1*a*. A far more expressive and flexible hierarchical scheme may also be used in conjunction with the method and apparatus for generating custom browse hierarchies, such as the one disclosed in the cross-referenced U.S. Patent Application entitled "Logical and Constraint Based Browse Hierarchy and Propagation Features." One of the benefits of this hierarchical scheme is that it permits the expression of items falling under a node in the hierarchy based on logical groupings as well as by constraints on item attributes and their values.

As one navigates down a path of connected nodes in one embodiment of such a hierarchy, the scope of items that are defined by (i.e. fall under) a node in the path tends to become progressively more narrow. This is because the constraints imposed on attribute values at any node in the hierarchy include all of the constraints specified by the node as well as its ancestor nodes. These constraints are implicitly ANDed together logically as an aggregation of such constraints as one navigates or browses through a path in the hierarchy. Thus, the number of items meeting the aggregation of constraints typically decreases as one travels down the browse path. The items that fall under a leaf node in the hierarchy can be thought of as only those items in the database that meet the aggregation of constraints on attributes and their values inherited from each of the nodes in the path all the way up to the root.

Each custom version of the seller's catalog is generated through the execution of a search query on the catalog database, which returns a set of SKUs representing the subset of catalog items unique to that custom catalog. The search query is derived from the set of rules-based constraints used to pre-define the unique set of items to be included in each custom catalog. The constraints specify particular attributes, their required values and the types of query operations to be performed on items having those attributes and attribute values. Each set of constraints is specified within one or more rules, and each set of rules is associated with a unique rule set identifier. Each of the subsets generated in accordance with a rule set is identified with same identifier as is used to identify the rule set (this identifier may sometimes also be referred to herein as a subset identifier). In one embodiment, these subsets of SKUs, along with their respective identifiers, are stored in a subset H) table and are used until the custom catalogs are republished. Each buyer or buyer group is assigned to a particular custom catalog by assignment to the rule set identifier associated with the assigned custom catalog. Those of skill in the art will recognize that some buyers will have common product/service interests and therefore will share the same customized catalog. Such a buyer group is therefore assigned to the same set of rules through a commonly assigned rule set identifier.

Likewise, for each custom version of the catalog, a custom version of the primary browse hierarchy may also be generated based on the primary browse hierarchy. In one embodiment, the process of generating customized browsing hierarchies starts out by initiating a query of the catalog database for each of the leaf nodes of the primary hierarchy. The query for each leaf node is formulated by first aggregating all of the constraints specified by each node of the hierarchy in the path between the leaf node and the root (i.e. that is an ancestor of the leaf node). An "include" rule is then established dictating that all items should be included that meet the aggregation of constraints. The database query is then derived from this rule and uses the results from the rule set searches stored in the subset ID table to return a set of subset identifiers representing all of the custom subsets that include at least one item SKU that meets the aggregated constraints of the rule.

In one embodiment, the query performs two functions at once. First, it searches the database until it locates an item SKU that meets the constraints, and it then joins this result with the subset ID table to obtain the subset (i.e. rule set) identifiers for all subsets that contain that SKU. This process continues until all SKUs in the database that meet the constraints have been processed in this manner. The result of the complete query is a set of all subset identifiers for catalog subsets that contain at least one SKU that meets the constraints, and this set is stored for each leaf node for use in generating the custom browse hierarchies.

Based on the search results temporarily stored for each leaf node of the primary hierarchy, the method for generating custom browse hierarchies then generates a custom hierarchy for each custom subset (i.e. catalog). Each custom hierarchy is generated for a particular subset by cloning (i.e. including in the custom hierarchy) only those leaf nodes (and their ancestors) for which there is at least one item SKU in the catalog subset. Put another way, the custom browse hierarchy generated for a particular custom catalog subset retains only those leaf nodes (and their ancestors) from the primary hierarchy for which the set of stored subset IDs resulting from the search for each leaf node described above includes the subset ID for the subset for which the browse hierarchy is being generated. This process is repeated for each custom catalog subset and a custom browse hierarchy is stored for each custom catalog and is identified with the same rule set identifier (i.e. subset ID) with which the custom subset is identified.

Those of skill in the art will recognize that the foregoing process is made extremely efficiently by performing the search on each leaf node, of the primary hierarchy up front, and then using the results to generate the custom hierarchies for each custom catalog subset. By doing so, the search for each leaf node is performed only once, regardless of how many custom subsets the seller may create.

In one embodiment of the invention, the seller performs a virtual publication process on a regularly scheduled basis. This virtual publication process serves to regularly update all of the custom versions of the catalogs to reflect any changes made to the catalog database or the rule sets defining the custom catalogs since the last update. The publication process further updates all of the customized browse hierarchies to reflect any changes in the custom catalogs as well as any changes in the primary browse hierarchy that may have occurred since the last update. The set of rules defining each custom version of the catalog is maintained independently from the catalog database. Likewise, the primary hierarchy, from which the customized browse hierarchies are generated, is also maintained independent of the contents of the database. Thus, whenever the catalog database, the rule sets or the primary hierarchy are modified, all custom catalogs and their associated custom browse hierarchies can be updated concurrently by simply performing the virtual publishing process on the new version of the catalog database.

During the publication process, the catalog database is temporarily locked so that no further modifications can be made to the catalog database until the virtual publication process is complete. A search of the catalog database is then executed as constrained by each set of rules to generate a new set of SKUs for each rule set. Each of the resulting sets of SKUs is associated with the identifier of the rule sets used to generate them. The sets of SKUs resulting from this virtual publication process are then used to generate custom catalogs in different modes depending upon the type of buyer for which the custom catalog is to be generated. As a further part of the publication process, a custom browse hierarchy also can be generated for each of the catalog rule sets as previously discussed, and is associated with the same rule set identifier as its corresponding custom catalog. The custom browse hierarchies are then retained in memory until the next publication update.

In one embodiment, the buyers are coupled to the seller's catalog database through an extranet, which is a network connection established between buyer and seller over the Internet. In this embodiment users authorized by buyers connect to the Internet and then contact the seller's web server through a web browser. The seller's web server responds with a request for authorization. Such a request includes the buyer's assigned rule set identifier and may also include a password. In response to the proper authorization data sent by the buyer, the application server provides the custom browse hierarchy identified with the buyer's assigned rule set identifier to the web server. The web server then transmits web pages including the custom browse hierarchy to the buyer's browser for display.

Once authorized and supplied with the custom browse hierarchy assigned to the buyer, the buyer may generate catalog inquiries, which are transmitted back to the web server over the Internet. The inquiry can be in the form of a direct search request provided in the form of a constraint-based rule to define a subset of items sought by the buyer. The inquiry can also be initiated automatically by selecting a leaf node in the custom browse hierarchy that generates a catalog inquiry in the form of a constraint based "include" rule. The "INC" rule includes all items meeting the aggregated constraints of the leaf node and those inherited from its ancestors (i.e. all nodes in the buyer's browse path).

The user's browser program transmits the catalog inquiry in the form of the INC rule over the Internet, which is received by the seller's web server application and provided to the application server. The application converts the rule based catalog inquiries to database queries as previously discussed and issues then to the database server. The database server executes the searches on the catalog database and returns the results to the application server. The application server then provides the user with only those items returned by the catalog inquiry search that intersect with the custom subset of catalog items generated using the rule set identified by the same rule set identifier as the rule set identifier assigned to the buyer. In one embodiment, the application provides a list of item SKUs and ancillary marketing and imaging data for each of the items in the form of web pages which are transmitted by the web server over the Internet and received by the buyer's browser and displayed.

Because the seller can directly control what data from the catalog database is returned to each buyer in response to a catalog inquiry, the responses from the seller can be filtered in real time using that set of SKUs generated by the buyer's assigned set of rules. Thus, versions of the catalog data customized for a particular buyer are essentially logical constructs. The scope of catalog data retrieved from the catalog database in response to a catalog inquiry is limited to only those items that are part of the custom subset of items defined by the rules specific to that buyer. Moreover, the browse hierarchy is pared down in scope from the most general primary hierarchy to a scope of items that is coextensive with (or at least does not exceed) the scope of items the particular buyer is permitted to see.

In another embodiment, custom versions of the catalog database are exported to external buyers not coupled to the seller's catalog database through an extranet connection. The scope of the catalog data comprising these exported custom versions are also constrained to the set of SKUs generated by the search performed during the virtual publication process in accordance with the set of rules assigned to the buyer. The difference is, the set of SKUs as generated for the buyer is used to create a complete physical manifestation of the custom version of the seller's catalog for the buyer (rather than doing so on a query by query basis as in the extranet embodiment). This physical manifestation of the buyer's custom version of the catalog data (consisting of all descriptive and attribute information for each SKU in the set) is then physically exported in its entirety to the buyer's site for incorporation. In one embodiment, a customized browse hierarchy is generated and exported for an external buyer only if the buyer so requests.

Structure and Methodology

Figure 2:
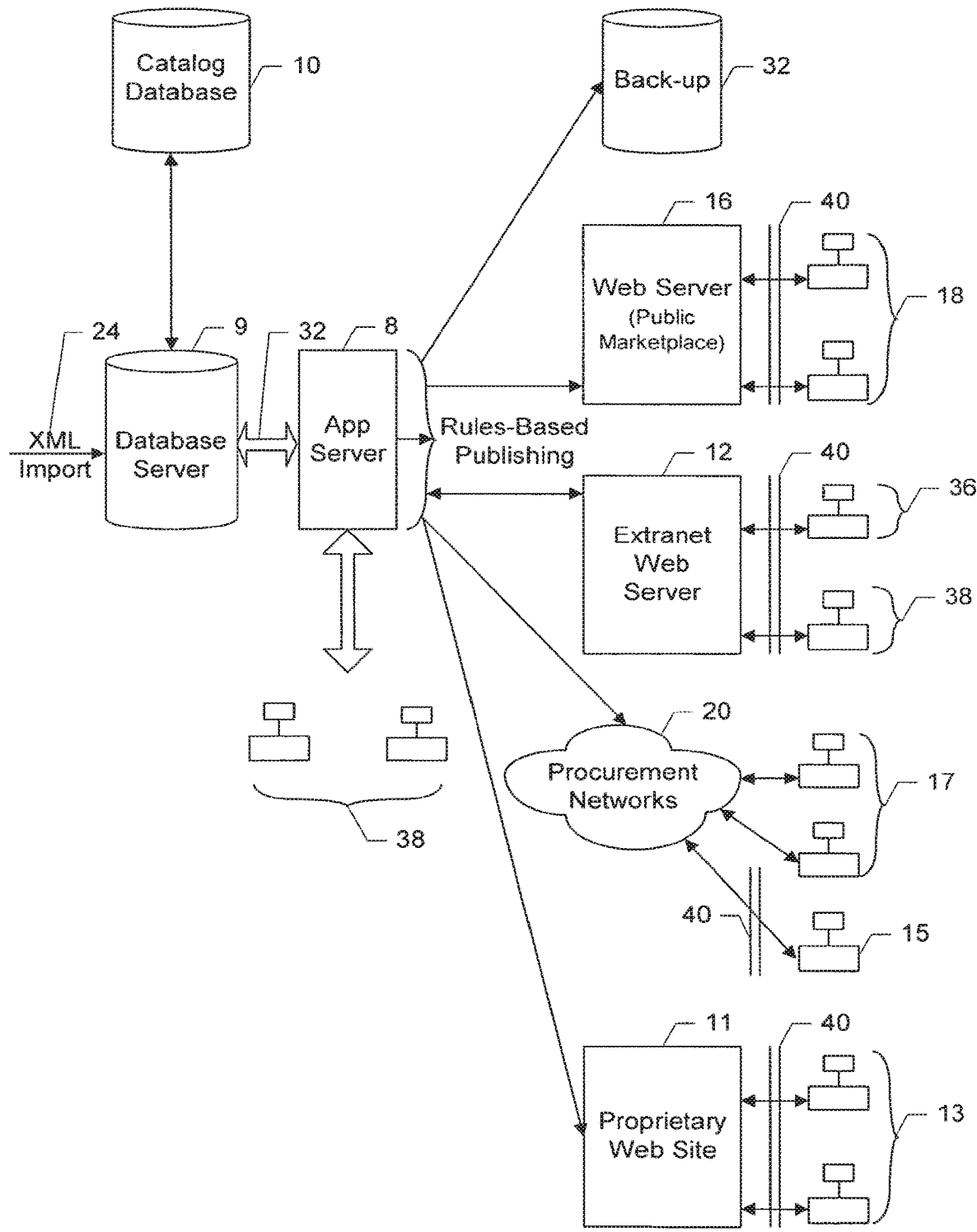
FIG. 2 shows a block-diagram representation of one embodiment of the apparatus for generating custom browse hierarchies.

Referring to FIG. 2, a high-level block-diagram representation of one embodiment of the apparatus for generating custom browse hierarchies is depicted. Catalog database 10 contains the most recent version of the catalog data assembled and maintained by the seller. The catalog data stored in the database 10 is accessed through queries made to database server 9. Database server 9 can be any server capable computer, including one capable of running SQL Server 7 by Microsoft. Item information can be imported into database 10 via import input 24 from manufacturers and vendors of items sold by seller. A format such as XML can be used to represent the imported data for easy manipulation and conversion.

Users authorized by the seller may be given access to the database 10 through an application program running on application server 8, which is in communication with the database server 9 through communications bus 32. The application server 8 can be any server capable computer, including a PC server capable of running the Windows NT operating system available from Microsoft Corporation. Updates to and maintenance of database 10 can be made directly by the seller-authorized users through the application program. In one embodiment of the invention, the application server 8 communicates with database server 9 over bus 32 using TCP/IP communications protocol and JDBC/ADO database protocols.

The set of arbitrary rules used to define the scope of the subset of catalog data to be included in each custom catalog is created by seller-authorized users through terminals 38 coupled to application server 8. The rules are physically stored with (although maintained independently from) the catalog data in database 10. The search queries derived from these rules are used by the database server 9 to search and retrieve the subsets of the catalog data for each custom catalog during the publishing process. The application formulates the series of queries based on the rules and issues those queries to the database server 9. The database server 9 searches and retrieves a subset of the catalog information in the form of item SKUs in response to the queries and of a scope that is constrained by the rules. The primary hierarchy is also developed by seller-authorized users through terminals 38. The primary hierarchy, including all nodes, note labels, optimal marketing text and image data, as well as node constraints are stored with, but maintained independently from, catalog data in the database 10. The application also generates the custom browse hierarchies for each of the subsets as a function of the content of each subset.

Each set of rules is associated with a unique identifier and each buyer or group of buyers for which a custom catalog is to be generated is assigned an identifier corresponding to the set of rules that specify the constraints that define the scope of items contained in that buyer's custom version of the catalog. Typically, the seller-authorized users who are charged with maintaining the database and setting up buyer accounts perform this function through terminals) 38. A more detailed discussion of the rules and the method of publishing the custom catalogs to various types of buyers are presented below.

FIG. 2 illustrates that customized versions of the seller's catalog data can be provided to buyers using the present invention in different modes, depending upon the type of buyer. One mode of providing customized versions of seller's catalog is employed for an extranet relationship between the seller and certain buyers. An extranet is simply a business-to-business link between the seller and one or more buyers using the Internet 40. In this case, extranet web server 12 couples buyer-authorized and seller-authorized users to the application server 8 over the Internet 40 through terminals 36 and 38 respectively. Thus, buyer-authorized users can access and browse the seller's catalog data directly using a computer such as a personal computer (PC) terminal 36 running a web browser.

In one embodiment, the application running on the application server 8 converts rule based buyer catalog inquiries to database queries in much the same way as it does for the rule sets. The database server executes the queries and returns to the application a set of SKUs the scope of which is constrained by the inquiry. The buyer's access is in real time, and can be a rule-based catalog inquiry specifying constraints input directly by the buyer in the form of a rule, or it can be generated in response to browsing a catalog hierarchy and selecting a leaf node of the hierarchy as previously described. The hierarchy presented to the buyer is one which has been customized to have a scope coextensive with (or at least not greater than) the custom subset for which it was generated. The seller has direct control over the responses produced in response to buyers' inquiries. The application running on application server 8 simply filters the set of SKUs returned to the buyer in response to the catalog inquiry by eliminating any items that are not also a member of the custom subset of SKUs generated during the publishing process using the rule set assigned to the buyer. In this mode, the seller provides a virtual custom catalog for each buyer instead of having to publish a physical manifestation of some subset of the catalog data that comprises each custom version.

For one extranet embodiment, seller-authorized users can perform catalog database rule set and primary hierarchy creation and maintenance either over the Internet 40 using a machine such as a PC running a web browser, or directly through the application server 8 as previously discussed. Both the seller and the buyer(s) authorize users to access the application running on application server 8, which is accomplished through extranet web server 12 coupled to browsers 36 and 38 over the Internet 40. Those of skill in the art will recognize that a single server could be used to run both the application as well as the web server application. Because the buyer has direct access to the database 10 through extranet web server 12 and application server 8, updates to the virtual custom catalogs and custom browse hierarchies for the extranet buyers are available to every extranet buyer immediately upon completion of the publication process.

A second mode in which customized catalogs can be provided to buyers using the present invention is through the process of exportation. One context for which exportation of customized catalogs is appropriate is when a buyer offers its own catalog of items through its own proprietary commercial web site 11. In this case, the buyer may wish to incorporate a subset of the seller's catalog data describing items of the seller that the buyer wishes to sell through its web site 11. Potential purchasers of the buyer's items typically access the buyer's proprietary web site 11 through browsers 13 over Internet 40.

A second possible context for which exportation is applicable is a public marketplace, whereby two or more buyers establish a proprietary web site with web server 16, through which they offer items including some of the seller's items. As in the previous example, proprietors of the public marketplace may wish to incorporate some subset of seller's items with some into its catalog. Customers of the public marketplace web site access the custom catalog information through browsers 18 over the Internet 40.

Another context in which exportation of customized catalog and pricing is applicable is when a seller wishes to offer some customized subset of its catalog to the many potential purchasers that belong to a private procurement networks 20. Member buyers and sellers are authorized to access the procurement networks, either directly using terminals 17, or indirectly through Internet 40 using browser 15.

In all of the foregoing contexts, exportation is required because the seller typically does not have direct access to the buyer's web site. Moreover, the catalog data comprising the customized subset of the catalog database often must be converted to some format of the buyer's specification prior to exportation. This could be a fairly standard format such as a version of XML (eXtensible Mark-up Language), or it might be a more proprietary format in the case of a procurement network. For the foregoing contexts, because the seller typically does not have direct access to the catalog data maintained by the buyers for the foregoing contexts, the newly generated custom catalog information generated by the seller must be exported to and incorporated by the buyer. Moreover, the buyer will likely have its own browse hierarchy that it maintains on its entire web site. Nevertheless, the present invention can be used to create and update not only the exportable manifestations of custom catalogs but also custom browse hierarchies of coextensive scope (if the buyer so desires) using the same virtual publication process as applied to the extranet environment. The difference is, the rules are applied to the entire database all at once (rather than on a query by query basis as in the extranet embodiment) to create a complete physical manifestation of the custom version of the seller's catalog and a custom browse hierarchy of coextensive scope. In an embodiment for non-extranet buyers, sets of SKUs are used to create a complete physical manifestation of the custom catalog for exportation, and a custom browse hierarchy is specifically requested by such a buyer and is physically exported with the custom catalog.

The fact that the customized catalog for a particular buyer is a subset of the items contained in the full catalog database 10 and that the custom browse hierarchy is pared down to have a scope that is coextensive with that subset of items is completely transparent to the buyers in both the extranet and non-extranet contexts. In both cases, the seller maintains the catalog database 10 and the primary hierarchy. In both cases customized versions of the catalog and browse hierarchy are generated during the virtual publication process. The only difference is that they are provided in real-time to the various extranet buyers, while physical manifestations of the customized versions of the catalog and browse hierarchy must be exported to external buyers.

Figure 3:
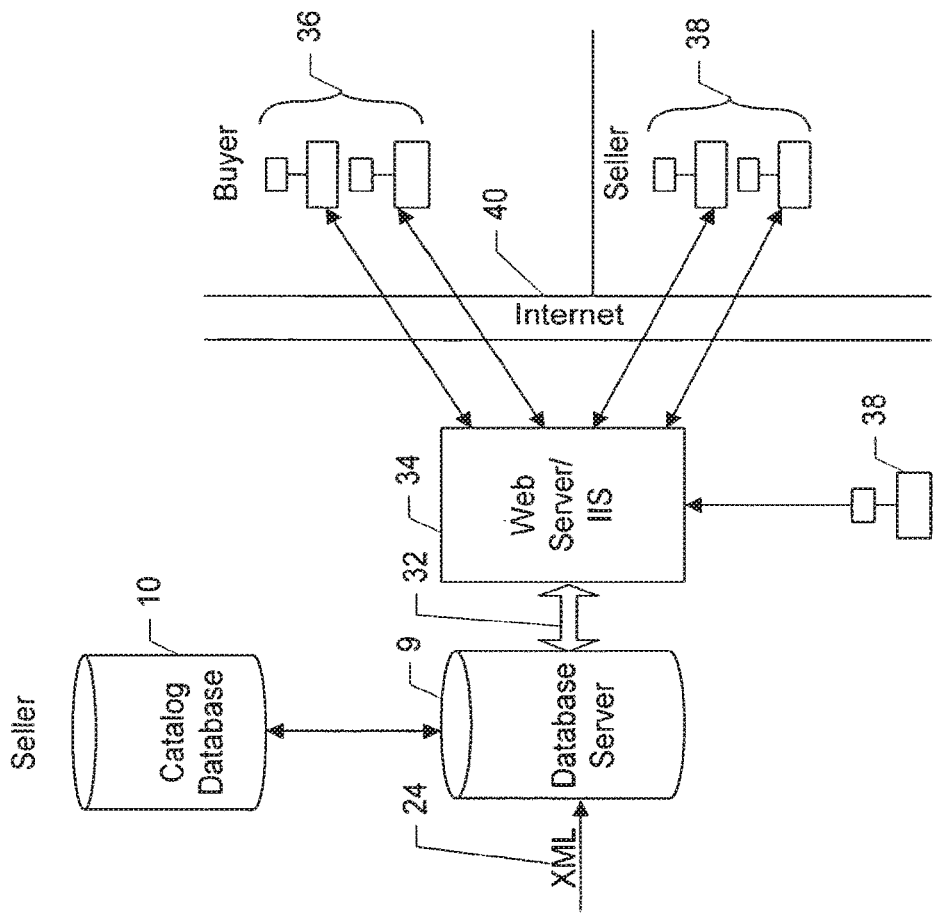
FIG. 3 shows a block-diagram representation of an extranet embodiment of the apparatus for generating custom browse hierarchies.

FIG. 3 illustrates one extranet embodiment of the invention. A database server 9 provides access to catalog database 10. The database server 30 receives queries from application/web server 34 over bus 32 using an appropriate communication and database protocol such as TCP/IP and JDBC/ADO respectively. As previously discussed, the application of the present invention and the web server application can be run on the same machine 34. Seller-authorized users can maintain and update the catalog database 10 and the primary hierarchy, and create new extranet accounts with buyers using terminals 38. The seller-authorized users can access the application directly or over the Internet 40 through the web server application. New catalog data can be imported into database 10 from manufacturers, suppliers, etc. over XML import 24. An example of an import file formatted in XML is attached hereto as Appendix A. The application/web server 34 typically runs an operating system such as Windows NT 4/IIS, available from Microsoft Corporation, or some version of Unix.

An account is typically set up for an extranet buyer by a seller-authorized user through terminals 38. The user can access the application directly, or over the Internet 40. As part of establishing the account, the buyer is assigned a rule set identifier corresponding to the custom catalog having a scope that best suits the relationship between the seller and the buyer. The rule set identifier also corresponds to the custom browse hierarchy generated with a scope coextensive with that custom catalog. Typically, access to the extranet will be regulated so that a buyer-authorized user must provide the buyer's assigned rule set identifier and some sort of password or other authorization information. Once authorized by the application, web pages are sent back to the user-buyer that display the custom browser corresponding to the rule set identifier of the buyer, and any additional data, such as marketing text and images, that the seller wishes to display along with the hierarchy.

Buyer-authorized users begin the process by accessing the database 10 using terminals 36. The users typically connect to the Internet 40 first through their Internet Service Provider (ISP) and then contact server 34 by entering the extranet URL to the browser. The web server application running on server 34 communicates with the application running on server 34 and returns an authorization web page that requests buyer authorization information and the buyer's rule set identifier. The user responds and the information is communicated to the server 34. The application verifies the information. If the user is authorized, the application communicates the correct custom browser hierarchy, based on the buyer's assigned rule set identifier, in the form of web pages for display on terminal 36. Catalog inquires are then generated either directly as a rules based search submitted by the user, or by browsing the hierarchy and selecting one of the leaf nodes. They are communicated by the browser to the web server, which passes them on to the application for conversion to a database query.

Those of skill in the art will recognize that database 10 can be coupled to server 34 and to additional servers, if one desires to expand the number of extranet connections to an arbitrary number of buyers. Moreover, the rules-based pre-publishing of custom catalogs can be used to customize versions of the catalog for any number of proprietary web sites, public marketplaces and procurement networks.

With reference to FIGS. 4*a*-4*e*, a detailed description of the procedural steps of the method of the invention is now presented. As illustrated by step 50 in FIG. 4*a*, the catalog database 10 is established, updated and modified through importation of vendor/supplier data and/or through direct input by seller-authorized users as previously discussed. In one embodiment, catalog data is stored in a database storage medium and can be categorized as catalog data and metadata. Catalog metadata includes product types and attributes and catalog data includes attribute values and ancillary marketing and image data.

In one embodiment, each item in the catalog is represented by a unique SKU ID (identifier) in the catalog database, and belongs to one product type. Unless an attribute is one that is deliberately made common to more than one product type, each attribute belongs to one product type and is identified by a unique attribute ID. Each product type is also uniquely identified with a product type ID. Those of skill in the art will recognize that the most common way to uniquely identify something in a table is with some form of numeric or alphanumeric identifier. Some examples of product type might be "personal computer," "memory," and "hard-drive." Some examples of attributes that might be uniquely associated with such product types might be "processor clock speed," "memory size," "vendor" and "capacity" respectively. Catalog data typically consists of part specific data such as attribute-value pairs. Examples are: "color=blue," "size=64 k," "processor speed=800 MHz," etc. Those of skill in the art will also recognize that, while it might be more convenient to store all of the seller's catalog data in a single database, the catalog data could be distributed over two or more databases if desired without deviating from the intended scope of the disclosed invention.

FIG. 5a illustrates a simple example of how the data is arranged in the database to facilitate maintenance, and FIG. 5b illustrates how the data of FIG. 5a is transformed at the time of publication to facilitate the rules-based searching by which the catalog subsets are generated. In FIG. 5a, the data is arranged such that there is only one attribute/value pair per row. Thus, each SKU as well as each product type can have multiple rows. For example, the item associated with SKU #123 has a row for each of its associated attributes. Attribute #1 (ATT #1)=vendor, ATT #2 processor clock speed, ATT #3=memory size, ATT #4 modem speed. Item SKU #123 is of product type I=desktop computer. The item uniquely identified by SKU #321 has a row for each of its four attributes. ATT #5 vendor, ATT #6 print type, ATT #7=print speed, ATT #8=print resolution. Item SKU 321 is of product type=2=printer. It should be pointed out that not all attributes must require a value, but for those that do, the application of the present invention will force a user to insert a value. Additionally, certain attributes (ATT-IDs) can be linked as common, so that searches can be performed that return, for example, all item SKUs having a value for that common attribute, regardless of product type.

Processing continues at Step 50 where sets of rules are established for each custom catalog in accordance with the scope of items that are appropriate to the particular buyer or buyer group. Buyers for whom the appropriate scope is the same will be assigned to the same rule set. Each rule set is given an identifier, and each buyer is associated with a particular rule set through the identifier. In one embodiment of the present invention, rules are specified in the form of either an include (INC) or exclude (EXC), and are constrained based on product type and att/val pairs. Each rule is implicitly ANDed together with all other rules for a particular buyer. They are performed sequentially and take the general form:

INC/EXC
All parts where:
   [ATT_Name op ATT_Val
   (AND) [ATT_Name opATT_Val]

where ATT_Name equals an attribute identifier, op is an operator {=, >, <, "starts with" or "contains"56 , ATT_Val is the value of the attribute to be included or excluded, and the AND is implicit.

Thus, an example search to include all software that is manufactured by Microsoft Corporation and is related to "Windows" could be expressed as follows:

```
INC
   All parts where:
      [Product type = 'software'
      [Vendor = 'Microsoft'
         [Description "starts with" 'Windows']
      ]
   ]
```

This search would return item SKUs such as Windows NT®, Windows 95®, Windows 2000® or applications developed by Microsoft that are described as Windows® compatible. One could add to the search to further narrow the results by excluding all parts described as being Windows 95® compatible. Thus, one can further exclude items that already have been included, or include some parts that were previously excluded. For example, one could append to the previous example to include all parts that have a VENDOR='Oracle.' A set of rules is created using this format for each buyer for whom the seller wishes to provide a customized catalog.

In one embodiment, the catalog rule-based inquiries issued to the application by a buyer are simply a single include (i.e. INC) rule such as those described above that specifies a series of implicitly ANDed attribute/value pairs. The user can input the rule directly, or it can be automatically generated by the browse hierarchy in response to the activation of a leaf node in the hierarchy. If based on selecting a leaf node, the constraints are aggregated automatically for all nodes residing in the browse path (i.e. for all ancestor nodes of the activated leaf node) and placed into the format of the INC rule.

The format illustrated in FIG. 5a is designed to facilitate the creation and maintenance of the catalog data. However, it is not optimal for searching for items having certain attribute values (VAL). Thus, as illustrated by step 52 of FIG. 4a, upon commencement of virtual publication (i.e. when new and/or updated custom catalogs are to be generated), the catalog database is locked and the data is converted to the format illustrated in FIG. 5b. A table is created for each product type, and each table comprises just one row per SKU, and a column for each attribute belonging to the product type. The tables of FIG. 5b include some additional item SKUs not shown in FIG. 5a to illustrate that other items can fall under the product type, and that each item SKU has a unique combination of the attribute/value (att/val) pairs. The advantage to the converted format is that when searches are performed on the data, the amount of data to be searched is pared down first based on product type, and then by attribute/value pairs.

It should be noted that the conversion process produces a read-only copy of the original database in the search-friendly format. Thus, the conversion process does not disturb the data in the database as configured in the maintenance-friendly format. In fact, once the format conversion process is completed, the original database is unlocked so those seller-authorized users can continue updating the catalog database, the rule sets and primary hierarchy without disturbing the publishing and exporting processes.

Those of skill in the art will recognize that the examples given by FIGS. 5a and 5b are for illustrative purposes only. For example, there can be an arbitrary number of product types, and an arbitrary number of attributes associated with those product types. Moreover, the alphanumeric representation of the attributes and attribute values are exemplary only, and can be expressed in any format appropriate to expressing and organizing the information in the manner described. For more information regarding the conversion of the database data from that in FIG. 5a to that of FIG. 5b, see cross-referenced U.S. Patent Application entitled "A Method for Building Digital Catalogs Optimized for Maintenance, Descriptiveness, And Fast Search."

Figure 7:
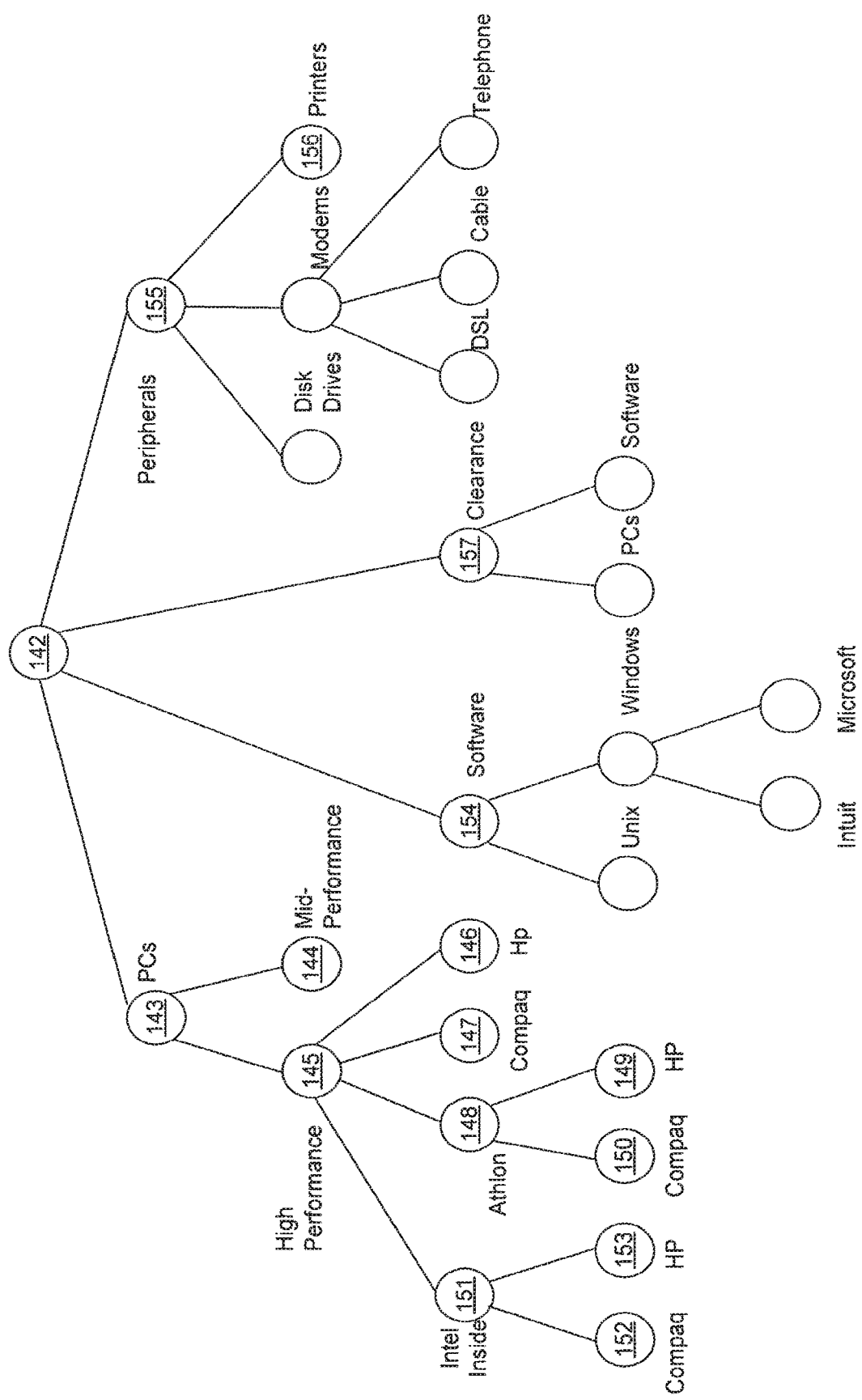
FIG. 7 illustrates one example of a primary hierarchy used by the method and apparatus for generating custom browse hierarchies.

Processing continues at step 51 where a seller-authorized user establishes a primary hierarchy for the catalog database. As previously discussed, the primary hierarchy will preferably cover a scope that is approximately co-extensive with the entire catalog database. Those skilled in the art will recognize that a primary hierarchy that covers more or less than the scope of the entire database may also be used. One example of a primary hierarchy is illustrated in FIG. 7. This hierarchy starts at root node 142, and is then split on a first level at nodes representing PCs 143, software 154, clearance 157 and peripherals 155. Root node 142 contains a list of its children nodes, and may also contain marketing text and image data that may be displayed with the top level of the hierarchy. The remaining nodes also each contain a list of their child nodes, and optionally may also include marketing text and image data that may be displayed upon selection of the node by a user during browsing. Further, the remaining nodes may optionally contain constraints that specify attributes of items contained in the database that fall under the scope of the node.

For example, node 143 contains a label that is "PCs," and typically would express a constraint that all items falling underneath node 143 have a PRODUCT TYPE=PC. Node 145 labeled "high performance," might specify the constraint that items falling underneath it must have an attribute which is PROCESSOR CLOCK SPEED and a value greater than or equal to 1 GHz. At the next level of the hierarchy underneath 145, nodes 151, 148, 147 and 146 further refine items in accordance with a vendor attribute. For example, node 151 specifies that all items falling hierarchically underneath it have an attribute that is PROCESSOR VENDOR=Intel. Finally, node 152 contains the label "Compaq" and expresses the constraint that all items underneath it have a Vendor=Compaq. Those of skill in the art will recognize that this is an example of a hierarchy for an example catalog database. Other hierarchical forms known in the art could be used as well. Moreover, each seller can arbitrarily organize the hierarchy within the constraints of the hierarchical format used.

Processing continues at step 54, where if there are extranet buyers established and recognized by the application and associated with an extranet buyer, processing continues to step 56 where searches are performed on the transformed version of the catalog database for each set of rules identified by the application. Searches are structured based on rules that define what should be viewable to each buyer from the entire database Referring to FIG. 4h, the details of processing step 56 are illustrated. At processing step 560, each rule set is executed as a series of sequential searches on the catalog database. Each rule in a rule set defines the scope of a search and is converted by the application into one or more database search queries. At processing steps 562 and 564, each time a search based on an "INCLUDE" rule (INC) is executed, a row is added to a subset table for each SKU returned by the search. The row contains a column entry for the SKU and another column entry containing the identifier assigned to the rule set being executed. Each time a search based on an "EXCLUDE" rule (EXC) is executed, any SKUs returned by the search having an entry in the subset table are deleted. Processing continues at step 56 until the execution of database queries for all rule sets assigned to extranet buyers has been performed and thus the subset table has been completed.

FIG. 6 illustrates one possible example of a subset table generated from the catalog database data reflected in FIG. 5b by one extranet embodiment of the present invention. The first subset might have been returned for a first search associated with a buyer organization denoted by subset ID=001. The search rules might have been to include all parts where product type=desktop computer and vendor Compaq, or the rule might have been to exclude all parts where the product type=desktop computer and vendor=Dell. The search for subset=002 might have been to include all parts where product type=desktop computers, or include all parts where product type=desktop computers and modem speed=56 k. The search for subset=003 might have been to include all parts where product type=desktop computers and all parts where product type=printers.

Figure 4A:
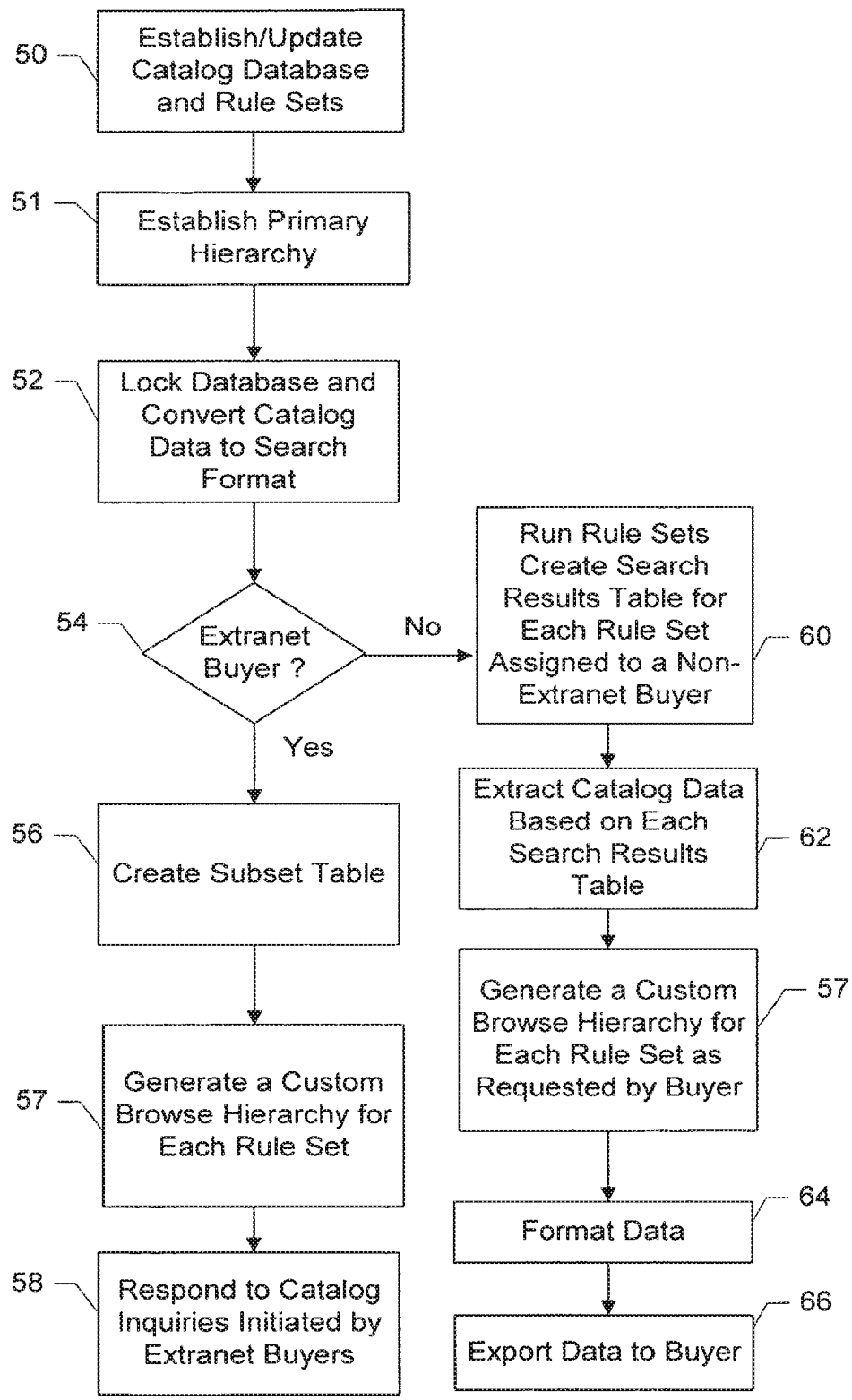
FIGS. 4*a-e* illustrate a procedural flow for one embodiment of the method of generating custom browse hierarchies.
Figure 4B:
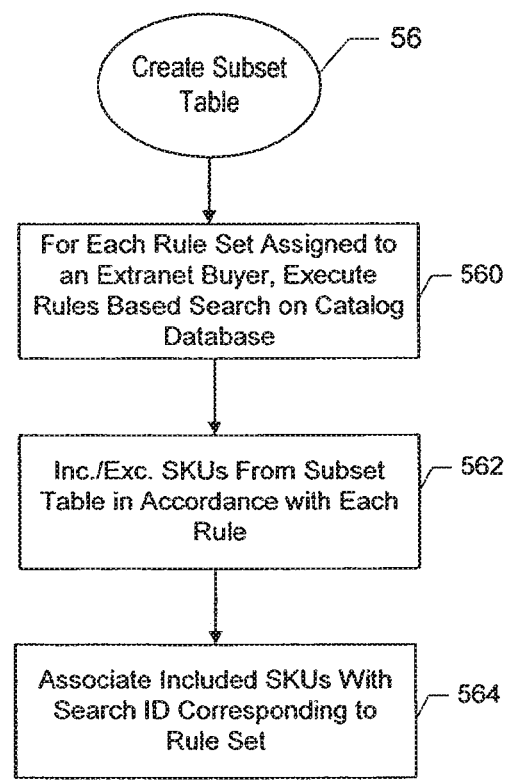
Figure 4C:
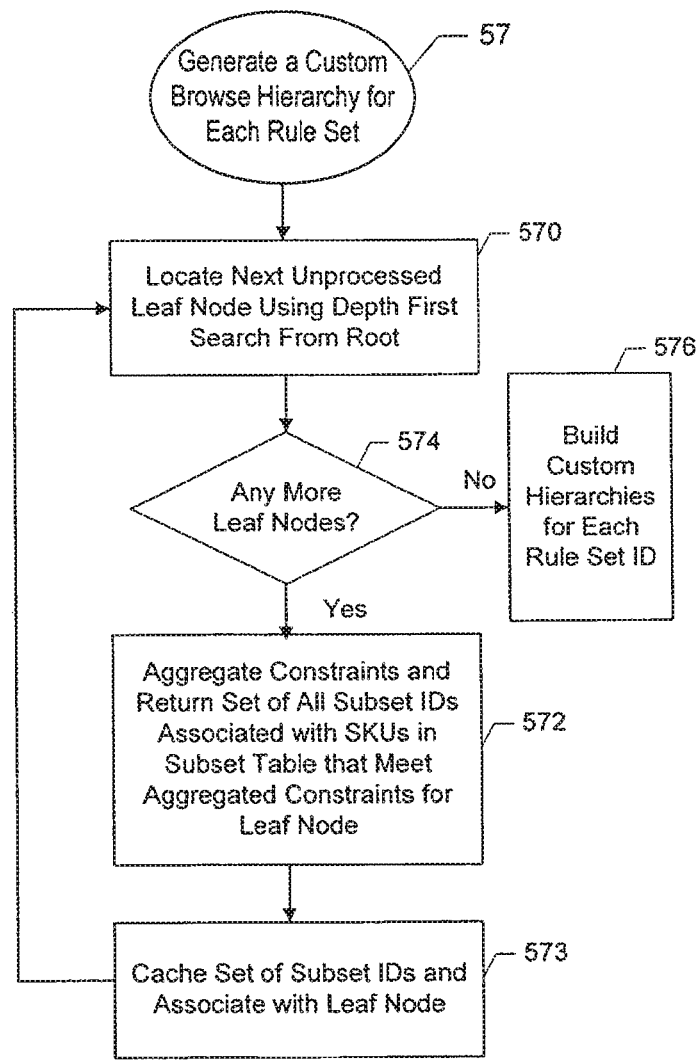

Once all extranet rules set searches have been completed, the subset table contains a set of SKU entries for each rule set, with each of the set of SKU entries identified by its corresponding rule set identifier. The set of SKUs for each rule set makes up the subset of the catalog database items comprising a custom catalog, the scope of which is defined by the specific rule set used to generate it. Processing then continues at step 57 (FIG. 4a), at which point a custom browse hierarchy is generated for each rule set having a scope which is coextensive with the scope of the subset of items defined by each rule set. A more detailed description of one embodiment of the process flow by which a custom browse hierarchy is generated in step 57 for a particular rule set is illustrated by FIG. 4c. This process is performed for each rule set assigned to an extranet buyer or buyer group.

Referring to FIGS. 4c and 7, processing continues at step 570 wherein a first unprocessed leaf node is located in the primary hierarchy based on a depth-first-search. With respect to the hierarchy in FIG. 7, this first step will identify node 152 as the first unprocessed leaf node. Processing then continues at decision step 574, where it is determined whether there are any unprocessed leaf nodes that were located under step 570. If an unprocessed leaf node was located, then processing continues at processing step 572. Otherwise processing continues at step 576 where the application begins building custom hierarchies for each rule set. Given that node 152 of the hierarchy example of FIG. 7 has been located as unprocessed, processing continues at processing step 572.

At processing step 572, any constraints specified by the leaf node 152 and all of its ancestor nodes through the browsing path up to the root 142 (i.e. including nodes 152, 151, 145, 143 and 142) are aggregated into a single INC search rule. This single search rule is used by the application to generate a database query that asks the database server to return al of the subset IDs having entries in the subset table that include a SKU that meets the aggregated constraints. This process is performed in a single step using a single database query. The database server scans the read-only copy of the catalog database, identifies a SKU that meets the aggregated constraints and joins this result with the subset ID table to identify all subset IDs which are stored in an entry of the subset table with the identified SKU. This process is performed for each SKU that the database server identifies as meeting the aggregated constraints until the entire catalog database has been searched. At processing step 573 a set of all subset IDs returned by this query are cached temporarily and associated with node 152. Processing then returns to step 570 wherein the next left-most leaf node is A identified in the primary hierarchy. In our example primary hierarchy of FIG. 7, this node will be node 153. This process illustrated in FIG. 4c is repeated for every leaf node of the hierarchy finishing with node 156. At this point, a set of subset IDs will have been cached in association with each leaf node in the hierarchy of FIG. 7. Each cached set represents all of the custom catalog subsets for which the leaf node should be retained in a browse hierarchy customized for those custom catalogs. For any subset IDs that have not been included in a particular set for a particular leaf node, this absence indicates that the leaf node should not be included in the custom browse hierarchy generated for those absent custom subsets because there are no items in the custom subset that fall under the items defined by the leaf node.

Figure 4D:
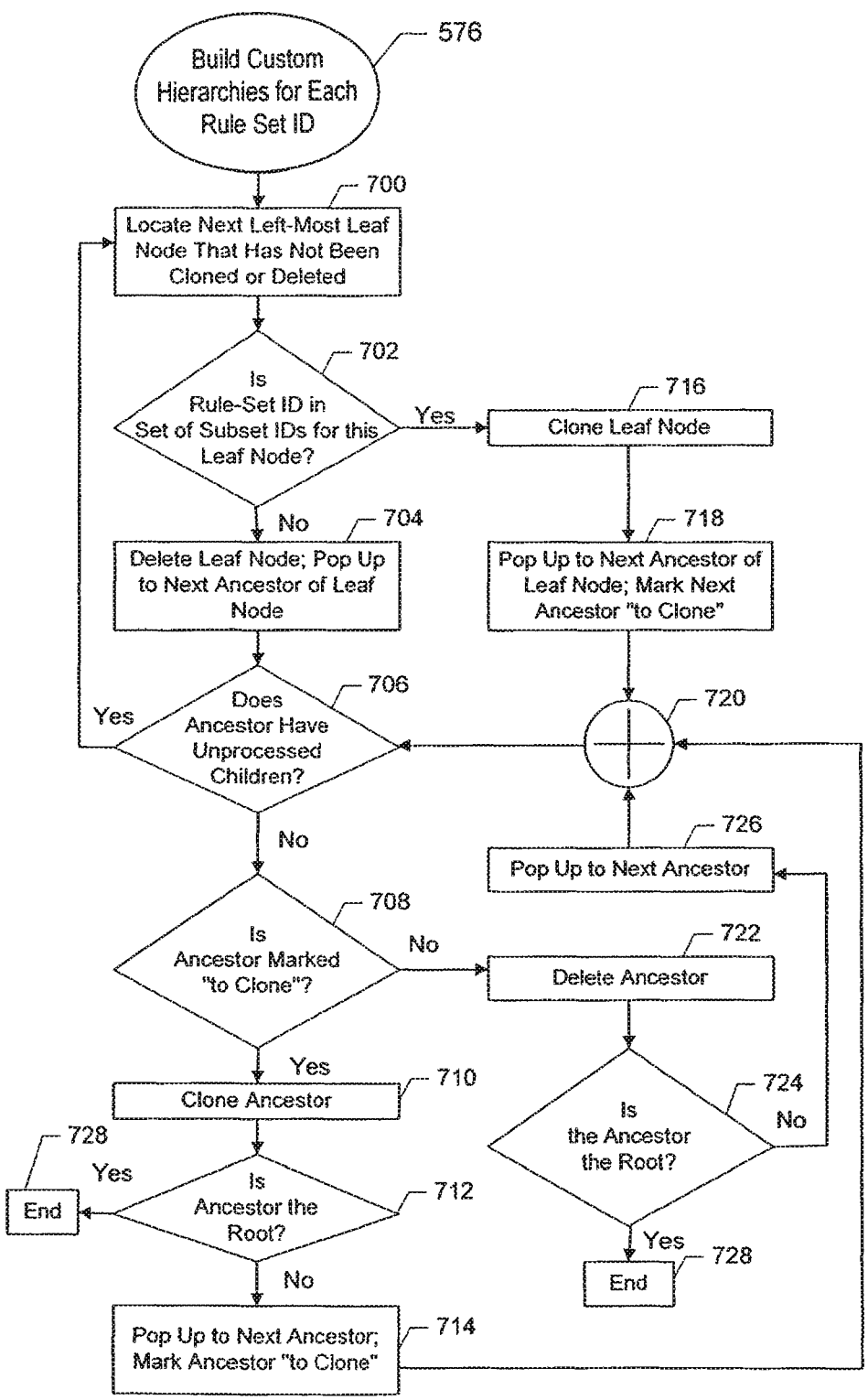

Once all leaf nodes have been processed as previously described, processing continues at step 576 where a custom hierarchy is generated for each custom catalog subset as represented by each rule set ID. A more detailed description of the process step 576 for generating custom hierarchies is illustrated in FIG. 4d. Processing continues at step 700 at which time the primary hierarchy is again walked in a depth first search, this time to determined the left-most leaf node that has not been cloned or deleted. As applied to the example hierarchy of FIG. 7, this will again start out with the identification of node 152. At processing decision step 702, it is determined whether the rule set ID associated with the custom catalog subset for which a custom hierarchy is currently being generated exists in the cached set for leaf node 152. If it does exist in the cached set, processing continues at step 716 where leaf node 152 is cloned as part of the custom browse hierarchy being generated. Processing then continues at 718 the process retreats one level to the parent node of leaf node 152 which is the next ancestor of 152, and this node is marked "to be cloned."

Processing continues at decision step 706 through intersection node 720 where it is determined whether the ancestor node 151 has any unprocessed children. In this case the answer is "yes," and processing resumes again at step 700 where the next left-most leaf is identified which, in our example, would be node 153. Processing continues again at decision step 702 to determine whether the rule set ID for the custom catalog subset for which a custom hierarchy is currently being generated and is contained in the cabled set for leaf node 153. If the subset ID does currently exist in the cache set for leaf node 145, processing continues as previously described at processing step 716 and beyond. If the subset ID is not included in the cached set for leaf node 153, processing continues at step 704 where leaf node 153 is not cloned and included in the custom browse hierarchy currently being generated. Processing then continues at decision step 706 where the process takes a step up in the hierarchy to the first ancestor of leaf node 153 where it is determined whether node 151 has any other unprocessed children. If the answer is yes, processing continues at step 700 as previously described. In our example primary hierarchy of FIG. 7, ancestor node 151 has no additional unprocessed children and therefore the answer to decision step 706 would be "No."

In this case, processing then continues at step 708 where it is determined whether ancestor node 151 has been marked "to clone" under processing step 718. Because it had been marked "to clone" based on the inclusion of leaf node 152 in the custom browse hierarchy being generated, the answer to decision step 708 is "Yes." Processing then continues at step 710 where ancestor node 151 is cloned to be included in the custom browse hierarchy being generated. At processing step 712, it is determined whether the ancestor node which was just cloned is the root of the hierarchy. With respect to our example hierarchy in FIG. 7, the answer to this step would be "No."

Processing would then continue at step 714 where the process takes another step back up in the hierarchy to the next ancestor node of node 151. In our example, this node would be node 145. Processing then continues through intersection node 720 at processing step 706 where it is determined whether the ancestor node 145 has any unprocessed children. In our example, the answer to this question is "Yes" because node 148 has not yet been processed. Therefore, processing continues at step 700 and beyond for leaf nodes 149, 150, 144, etc. as previously described.

Returning back to processing step 708, had the answer to the question posed been "No" rather than "Yes," ancestor node 151 would have been deleted in step 722 because it would not have had any children which were cloned underneath it and therefore the ancestor node would not be necessary either. Processing then continues at decision step 724 where it is determined if the ancestor that was just deleted is the root of the hierarchy. If the answer is "Yes," the process ends in step 728 for this custom browse hierarchy and a custom browse hierarchy is then generated for any remaining rule sets for which one has not yet been generated. If the answer is "No," processing continues at step 726 where the process takes a step back up in the hierarchy to the next ancestor node 143 and then processing continues at decision step 706 through intersection node 720 and processing proceeds as previously described.

Thus, the process proceeds until the root is either cloned or deleted and the custom browse hierarchy has either been generated with a number of nodes which have been cloned from the primary hierarchy or the process ends in the unlikely situation where absolutely no leaf nodes have been cloned and therefore no browse hierarchy has been generated at all Once again, the process described by processing step 576 is continued until custom browse hierarchies have been generated in this manner for all rule sets.

Figure 4E:
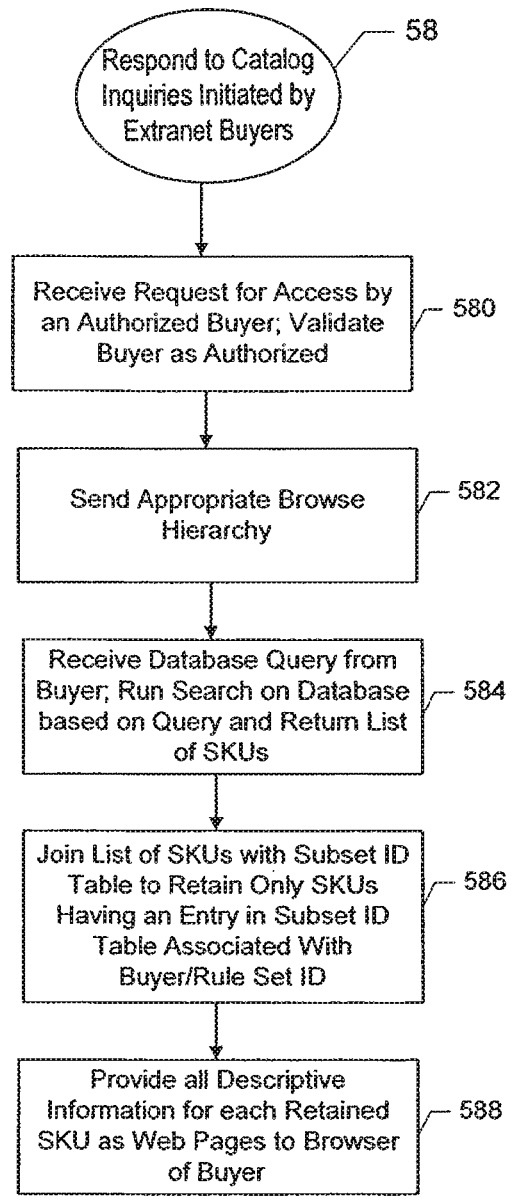

Once all the custom browse hierarchies have been generated for each rule set, the virtual publishing process has been completed for extranet buyers. The system is now prepared to receive requests from users authorized by buyers to access the catalog database through their respective extranets and respond to catalog inquiries initiated by extranet buyers at step 58, which is illustrated in more detail in FIG. 4e. As previously described, this process typically involves the user accessing the internet through their internet service provider (ISP) and sending the request using a browser program to the seller's web server. The request typically includes the rule set identifier assigned to the buyer as well as some sort of authorization number that identifies the particular buyer. This step is illustrated in FIG. 4e at step 580. Typically, the validation process will involve a password to permit only those authorized by the buyer to access the catalog database.

Once the user has been authorized, the next step in the process is illustrated by processing step 582 at which time the application provides the appropriate customized browse hierarchy associated with the rule set identifier assigned to the buyer which is then provided to the buyer's browser over the internet as a set of web pages as transmitted by the seller's web server for display on the buyer-authorized user's browser terminal. Processing then continues at step 584 where catalog inquiries may be generated by the buyer-authorized user. These inquiries being generated by the browser, transmitted over the internet, and received by the seller's web server. Buyer catalog inquiries can be generated in one of two ways. The first is by browsing the customized browse hierarchy currently displayed on the user's terminal. Typically, selecting a leaf node will cause the aggregation of all constraints contained in any of the nodes in the path browsed by the user and a rule based catalog inquiry will be generated based on that aggregation of constraints and transmitted to the seller's web server over the internet and then passed from there to the seller's application server. The application server then converts the rules based catalog inquiry into a database query which is used to search the catalog database and return a set of SKUs that meet the aggregated constraints. In step 586, this set of SKUs is then joined to the subset ID table and only those SKUs that have entries in the subset ID table that are associated with the buyer's assigned rule set identifier will ultimately be returned back to the user by way of the internet. In step 588, all descriptive information for each retained SKU is provided a Web page to a browser of a buyer. The information that is returned to the user may include a list of SKUs, item attributes, and associated image and marketing text that the seller may wish to display in conjunction with the returned set of SKUs.

A second way that a user may browse the catalog database is to use an input box provided by the browse hierarchy web page that permits the user to generated directly a rules based search similar to those that are automatically generated by browsing the hierarchy. The process by which this catalog inquiry is transmitted, received by the seller, processed by the application, and information concerning the SKUs which meet the constraints of the catalog inquiry as well as fall within the subset of SKUs which are associated with the buyer's rule set identifier is the same as previously described above.

Referring back to FIG. 4a and decision step 54, if non-extranet buyers have also been identified, processing for those buyers proceeds at step 60. At step 60, searches are run on the catalog database for all of the rule sets assigned to non-extranet buyers in virtually the same manner as at step 56. One difference is that separate catalog subset tables are created for each of the rule sets assigned to non-extranet buyers. Processing then continues at step 62, where catalog data, including all descriptive information associated with each item SKU, is extracted from the catalog database for all SKUs in each catalog subset table. In essence, a complete copy of the catalog subset is created for each rule set assigned to a non-extranet buyer. This must be done because, unlike the extranet buyer, the non-extranet buyers are not directly coupled to the catalog database.

At step 57, a custom browse hierarchy can also be generated in accordance with the process described for extranet buyers if requested by the buyer. Because a non-extranet buyer is likely going to incorporate the catalog information into another database, a custom browse hierarchy will not likely be appropriate.

Finally, at step 64 a copy of the extracted catalog data (and the custom browse hierarchy if requested) is then created and formatted for each non-extranet buyer assigned to the rule set from which the extracted data has been generated, and at step 66 formatted copy of the extracted catalog data is then exported to the non-extranet buyer's web site at step 66. The extracted catalog subset can be provided in an XML format, or it can be converted to the buyer's format during step 64. Typically, a procurement network has its own standard format to which the subset of the catalog data must be converted. The procurement network proprietor may specify that the customized subset generated at step 62 to be formatted in some intermediate format, which the proprietor can then convert to the format of the network.

Those of skill in the art will recognize that regardless of whether the custom catalog subsets are provided to buyers through export to offline web sites or procurement networks, or directly through on-line extranets, the method and apparatus of the present invention makes it far easier on the seller to publish custom catalogs for its various buyers. The seller need only create and maintain one catalog database in one physical location that represents the superset all available goods/services offered by the seller. The seller then simply establishes a set of rule based searches, one for each buyer or buyer organization, and then generates the custom subset of the superset by executing the searches and returning a set of SKUs for each buyer. If the database is updated, the seller need only run the established sets of rules to publish updated custom catalogs for each buyer. If the relationship between seller and buyer evolves and requires a different scope of products or services (i.e. items) to be included in that buyer's catalog, only the set of rules needs to be altered, at which point the buyer's catalog is simply regenerated using the same database, The above embodiments illustrate but do not limit the invention. In particular, the invention is neither limited by the types of computers used as servers, nor the operating systems, web server or database server application software running on such servers. The invention is limited neither by the types of user terminals used to connect to the servers, nor the type of browser software resident on the terminals. The invention is neither limited by the structure of the data as stored in the database, nor is it limited by the nomenclature used in identifying data types and attributes. The invention does not have to be implemented using the Internet, but rather may be implemented over any network, using any type of transmission protocol and display formats. Those of skill in the art will recognize that while a single centrally maintained catalog database is illustrated, one could have a number of databases or other partitioning of the data from which the custom catalogs could be generated without exceeding the intended scope of the invention.

In addition, while the invention is illustrated in the disclosed embodiments as a centrally maintained catalog subset for a seller, those of skill in the art will recognized that it may also be used by, for example, a large buyer maintaining a database of desired requisition items. A number of suppliers could be authorized to respond to some subset of such requests by the buyer, and the invention could be used to constrain the various requests for materials or services seen by any particular supplier. Other embodiments and variations are within the scope of the invention, as defined by the appended claims.

Finally, many embodiments of the present invention have application to a wide range of industries including the following: computer hardware and software manufacturing and sales, professional services, financial services, automotive sales and manufacturing, telecommunications sales and manufacturing, medical and pharmaceutical sales and manufacturing, and construction industries. Other embodiments and variations are within the scope of the invention, as defined by the appended claims.

What is claimed is:

1. A method of utilizing one or more of a plurality of browse hierarchies each representative of a unique subset of items and utilizing filtered access to data representing the items via one or more transmitted web pages, said method comprising:
performing by a computer system programmed with code stored in a memory and executing by a processor of the computer system which configures the computer system into a machine:
accessing and utilizing one or more of the plurality of browse hierarchies, wherein generation of each of the browse hierarchies comprises:
for each leaf node of a primary hierarchy representative of the items:
establishing a search rule that comprises an aggregation of constraints specified by the leaf node and its ancestors;
identifying all of the unique subsets that contain at least one of the items meeting the aggregation of constraints; and
creating a custom browse hierarchy for each of the unique subsets, said creating further comprising retaining in the custom browse hierarchy only those leaf nodes, and their ancestors, from the primary hierarchy for which the unique subset has been identified by said identifying; and
receiving web pages from a web server utilizing the browse hierarchies, wherein the web pages include data to interact with a browser application executing on the computer system to filter the items in accordance with the browse hierarchies and permit a user of the browser application to access and search data in the electronic catalog as filtered by the browse hierarchy.

2. The method of claim 1 wherein each of the unique subsets are identified by a different subset ID, each of the items are stored in a database and each of the items comprising each of the unique subsets is stored in an entry of a subset ID table, the entry further containing the subset ID that identifies the unique subset to which the item belongs, said identifying further comprising:
executing a search of the database to identify each of the items in the database that meet the constraints; and
for each of the items identified by said executing a search, performing a table join between the identified item and the subset ID table to return a list of all subset IDS that are stored in an entry of the subset ID table with the identified item.

3. The method of claim 2 wherein said retaining further comprises:
for each leaf node of the primary hierarchy:
locating a next unprocessed leaf node of the primary hierarchy;
retrieving the returned list of all subset IDs for the next unprocessed leaf node; and
cloning the next unprocessed leaf node and its ancestors into the browse hierarchy if the subset ID identifying the unique subset is contained in the returned list of all subset IDs for the unprocessed leaf node.

4. The method of claim 2 wherein said executing a search further comprises:
translating the search rule to a database query;
issuing the database query to a database server coupled to the database; and
wherein the database server executes the search and performs the table join in accordance with the database query.

5. The method of claim 4 wherein said translating the search rule to a database query is performed by an application program being executed on an application server.

6. The method of claim 2 wherein the items are products or services, and the items are represented by catalog data stored in the database, the catalog data comprising a unique product identifier, one or more attributes, a unique value for each of the attributes, and associated descriptive information.

7. The method of claim 2 wherein said creating further comprises identifying each browse hierarchy with the subset ID used to identify the unique subset for which the browse hierarchy identified by the subset ID for display on a terminal having access to the database in response to a request identified by the subset ID.

8. The method of claim 7 wherein said providing further comprises:
formatting the created browse hierarchy as one or more web pages; and
transmitting the web pages over the Internet for display on the terminal using a web browser.

9. The method of claim 7 further comprising:
formatting one or more copies of the created browse hierarchy; and
exporting each formatted copy to an entity associated with the subset ID.

10. The method of claim 1 wherein each of the unique subsets of items comprises a catalog, and wherein the browse hierarchy generated for each of the unique subsets is operable to browse the catalog.

11. A method of generating a plurality of browse hierarchies each representative of a unique subset of items and providing filtered access to data representing the items via one or more transmitted web pages, said method comprising:
performing by a computer system programmed with code stored in a memory and executing by a processor of the computer system which configures the computer system into a machine:
for each leaf node of a primary hierarchy representative of the items:
establishing a search rule that comprises an aggregation of constraints specified by the leaf node and its ancestors; and
identifying all of the unique subsets that contain at least one of the items meeting the aggregation of constraints;
creating a browse hierarchy for each of the unique subsets, said creating further comprising retaining in the browse hierarchy only those leaf nodes, and their ancestors, from the primary hierarchy for which the unique subset has been identified by said identifying;
providing the browse hierarchies to a web server; and
transmitting the one or more web pages to a client computer system, wherein the web pages include data to interact with a browser application executing on the client computer system to filter the items in accordance with one or more of the browse hierarchies and permit a user of the browser application to access and search data in the electronic catalog as filtered by the one or more browse hierarchies.

12. The method of claim 11 wherein each of the unique subsets are identified by a different subset ID, each of the items are stored in a database and each of the items comprising each of the unique subsets is stored in an entry of a subset ID table, the entry further containing the subset ID that identifies the unique subset to which the item belongs, said identifying further comprising:
    executing a search of the database to identify each of the items in the database that meet the constraints; and
    for each of the items identified by said executing a search, performing a table join between the identified item and the subset ID table to return a list of all subset IDS that are stored in an entry of the subset ID table with the identified item.

13. The method of claim 12 wherein said retaining further comprises:
    for each leaf node of the primary hierarchy:
        locating a next unprocessed leaf node of the primary hierarchy;
        retrieving the returned list of all subset IDs for the next unprocessed leaf node; and
        cloning the next unprocessed leaf node and its ancestors into the browse hierarchy if the subset ID identifying the unique subset is contained in the returned list of all subset IDs for the unprocessed leaf node.

14. The method of claim 12 wherein said executing a search further comprises:
    translating the search rule to a database query;
    issuing the database query to a database server coupled to the database; and
    wherein the database server executes the search and performs the table join in accordance with the database query.

15. The method of claim 14 wherein said translating the search rule to a database query is performed by an application program being executed on an application server.

16. The method of claim 12 wherein the items are products or services, and the items are represented by catalog data stored in the database, the catalog data comprising a unique product identifier, one or more attributes, a unique value for each of the attributes, and associated descriptive information.

17. The method of claim 12 wherein said creating further comprises identifying each browse hierarchy with the subset ID used to identify the unique subset for which the browse hierarchy identified by the subset ID for display on a terminal having access to the database in response to a request identified by the subset ID.

18. The method of claim 17 wherein said providing further comprises:
    formatting the created browse hierarchy as one or more web pages; and
    transmitting the web pages over the Internet for display on the terminal using a web browser.

19. The method of claim 17 further comprising:
    formatting one or more copies of the created browse hierarchy; and
    exporting each formatted copy to an entity associated with the subset ID.

20. The method of claim 11 wherein each of the unique subsets of items comprises a catalog, and wherein the browse hierarchy generated for each of the unique subsets is operable to browse the catalog.

* * * * *